United States Patent [19]

Parke et al.

[11] 4,182,491
[45] Jan. 8, 1980

[54] REMOTE CONTROL SPRAYING APPARATUS

[75] Inventors: James G. Parke; Richard O. Norman; Edward D. Colle; Edsel M. Fussell, all of San Antonio, Tex.

[73] Assignee: Micro-Gen Equipment Corp., San Antonio, Tex.

[21] Appl. No.: 781,530

[22] Filed: Mar. 25, 1977

[51] Int. Cl.² .............................................. B05B 7/26
[52] U.S. Cl. ...................................... 239/11; 239/77; 417/42
[58] Field of Search .................. 417/22, 24, 42, 44, 417/293; 239/61, 71, 11, 74, 77; 73/198, 194 E; 340/167 A

[56] References Cited

U.S. PATENT DOCUMENTS

| | | | |
|---|---|---|---|
| 3,156,115 | 11/1964 | Adelmann | 73/272 A X |
| 3,239,960 | 3/1966 | Stevens | 43/129 |
| 3,572,959 | 3/1971 | Geoghegan | 417/22 X |
| 3,729,996 | 5/1973 | Metz | 73/194 E |
| 3,847,507 | 11/1974 | Sakiyama et al. | 417/42 |
| 3,917,168 | 11/1975 | Tenney | 239/77 X |
| 3,965,341 | 6/1976 | Honey | 73/194 E |
| 3,982,351 | 9/1976 | Waldron | 43/129 |
| 3,985,467 | 10/1976 | Lefferson | 417/20 |
| 4,026,668 | 5/1977 | Culhane et al. | 417/293 |

*Primary Examiner*—John J. Love
*Attorney, Agent, or Firm*—Fitzpatrick, Cella, Harper & Scinto

[57] ABSTRACT

A control device for metering fluid flow from a remote location is shown in conjunction with an insecticide spraying apparatus. The spraying apparatus includes a compressed air source feeding pressurized air to a nozzle for mixing with a liquid and discharge to atmosphere. A metering pump feeds the liquid to the nozzle in response to a digitized input signal received from a remote control device. A digitized feedback signal including a number of pulses per unit time from the metering pump to the remote control device indicates the rate of flow of the liquid through the metering pump. The remote control device compares the digitized feedback signal with a control voltage to generate the digitized input signal which is a pulse-width modulated signal, which digitized input signal maintains the flow rate of the liquid. A pressure switch connected to the nozzle insures a predetermined pressure therein before the metering pump will begin feeding liquid to the nozzle.

14 Claims, 5 Drawing Figures

REMOTE CONTROL SPRAYING APPARATUS

BACKGROUND OF THE INVENTION

This invention relates to a remote control device for metering fluid flow and, more particularly, a remote control device for insuring a predetermined flow rate of insecticide to a spraying apparatus. The remote control device sends a digitized input signal to a metering pump. Operation of the metering pump generates and sends a digitized feedback signal to the remote control device. The digitized feedback signal is directly related to the rate of flow through the metering pump, and can be used to give a digital indication thereof. Also, the digitized feedback signal adjusts the digitized input signal to maintain the rate of flow.

BRIEF DESCRIPTION OF THE PRIOR ART

Prior to the present invention, different types of remote control apparatuses have been designed for use in conjunction with insecticide spraying equipment. Typically, large insecticide spraying equipment has been designed for mounting in the rear of an open vehicle, such as a truck. Control panels for such insecticide spraying equipment would be located in the cab of the truck. However, control panels used in the past normally required insecticide flow lines to extend into the remote control apparatus contained in the cab of the truck. To maintain a rate of flow, various repeated adjustments had to be made to account for changing conditions, such as temperature, pressure, viscosity, just to name a few.

A typical example of such a remote control apparatus requiring repeated adjustments, and also requiring a flow line extending into the cab of the truck, is shown in U.S. Pat. No. 3,982,351. A thermometer in a flow line is necessary to monitor the temperature of the insecticide, as well as a pressure gauge to determine the pressure of the air being supplied to a discharge nozzle by the compressor. An adjustment is shown for controlling the flow rate, which adjustment must be changed in response to changing environmental conditions or operation of the equipment.

Other types of insecticide spraying apparatuses have attempted to maintain a constant viscosity of the insecticide by use of heaters to raise the insecticide to a predetermined temperature. The use of such heating elements require additional power, making the insecticide spraying equipment more costly to purchase and operate. Further, a control is necessary to insure that the heating element is heating the insecticide to a constant temperature. A typical such spraying apparatus is shown in U.S. Pat. No. 3,242,098, which patent has a source of fuel for heating the insecticide prior to discharge to atmosphere. However, even the heating of the insecticide prior to discharge does not insure that an accurate rate of flow of insecticide is being obtained.

Despite the use of burners or other heating elements to increase the temperature of the insecticide to a predetermined temperature, many times it is necessary to pressurize the insecticide tank to insure an adequate amount of insecticide will flow therefrom independent of the temperature of the insecticide in the tank. Otherwise, even though the burner would insure the insecticide being discharged to atmosphere was a given temperature, there may not be a constant rate of flow of insecticide from an insecticide tank as the temperature therein varies.

SUMMARY OF THE INVENTION

It is an object of the present invention to provide a remote control device for metering fluid flow.

It is another object of the present invention to provide a spraying apparatus with a remote control device for metering insecticide being dispersed by the spraying apparatus.

It is still another object of the present invention to provide a remote control apparatus and metering pump for use in conjunction with an insecticide spraying apparatus, which metering pump is responsive to a digitized input signal from the remote control device to give a predetermined flow rate of insecticide being pumped by the metering pump to the nozzle. A digitized feedback signal from the metering pump to the remote control device insures that the rate of flow of insecticide through the metering pump to the nozzle is maintained despite environmental changes, such as temperature of the insecticide.

It is yet another object of the present invention to remotely control a metering pump by a digitized input signal from a remote location. The metering pump generates and sends a digitized feedback signal to the remote location for comparison with a control signal to regulate the digitized input signal by varying the pulse width thereof. A time base feeds clock pulses into a counter which also receives the digitized feedback signal. The number of individual feedback signals received by the counter between each individual clock pulse is visually indicated in a digital display. By proper adjustment of the frequency of the clock pulses, the number displayed will be representative of flow rate through the metering pump.

An insecticide spraying apparatus has a motor driving a compressor for feeding pressurized air to an insecticide spraying nozzle. The nozzle receives insecticide from a metering pump for mixing with the compressed air prior to discharge to atmosphere. Once the nozzle has reached a predetermined pressure, a control signal is digitized and amplified by a remote control device prior to feeding to the metering pump as an input signal. The input signal operates the metering pump which turns a spoked wheel having a magnetic pickup device adjacent thereto. The magnetic pickup device generates an oscillating output directly related to the rotational speed of the metering pump. In turn, the rotational speed is directly related to the flow rate through the metering pump. The oscillation output is fed to the remote control device and converted to a pulsed waveform to give a digitized feedback signal. The digitized feedback signal and a clock output of a time base generator are fed into a counter in the remote control device. By proper adjustment of a time base generator, the number of individual feedback signals received by the counter between each individual clock pulse will be indicated in a suitable digital display to represent the flow rate through the metering pump. The signal from the magnetic pickup device is converted to a DC voltage and compared with the control signal through a differential integrator to give an output if the feedback signal is different from the control signal. The output from the differential integrator makes changes in a pulse generator and width modulator to vary an input signal of the metering pump thereby maintaining a constant flow rate therethrough. The metering pump is pulsed by pulses of varying widths, which widths are determined by the control signal and the feedback signal received in the differential integrator. A bypass switch around the pressure switch allows for calibration of the flow rate of the metering pump without discharge of insecticide to atmosphere.

DESCRIPTION OF THE PREFERRED EMBODIMENT

Figure 1:
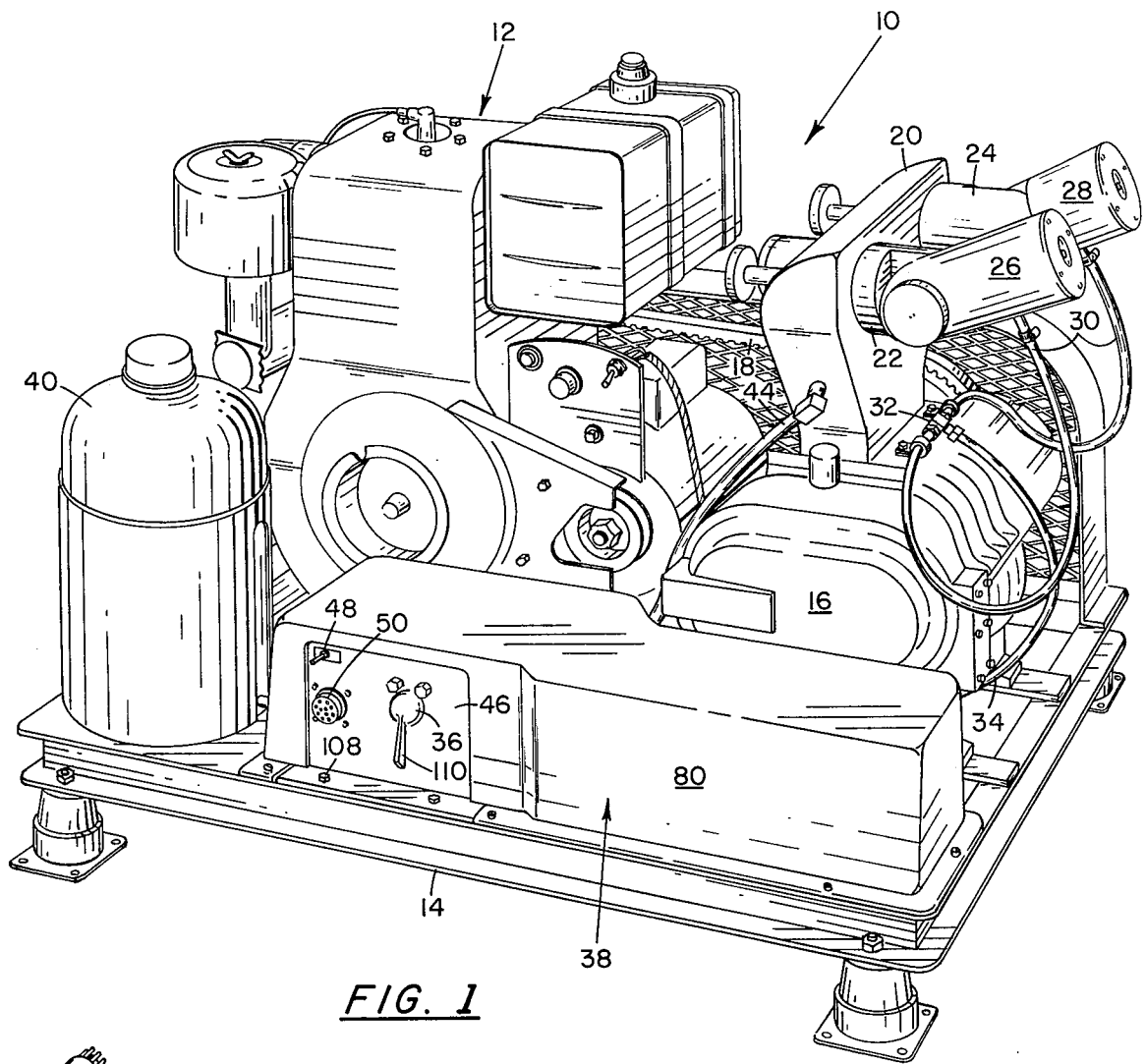
FIG. 1 is a perspective view of an insecticide spraying apparatus for use with a remote control device.

Referring now to FIG. 1 of the drawings, there is shown an insecticide spraying apparatus represented generally by reference numeral 10. The insecticide spraying apparatus 10 includes a motor 12 mounted on frame 14. The motor 12, which may be of any suitable type such as an internal combustion engine, drives compressor 16 by means of belt 18. The compressor 16, which may also be of any suitable type, is mounted on frame 14. The compressed air from compressor 16 feeds through a manifold 20 and horizontal conduits 22 and 24 to discharge nozzles 26 and 28, respectively. Also connected to the discharge nozzles 26 and 28 is an insecticide supply line 30. Through a coupling tee 32 both of the supply lines 30 are connected to one insecticide conduit 34. The insecticide conduit 34 indirectly connects to selector valve 36 in a localized control portion 38 through metering pump 88, as well as conduit 82 (see FIG. 2) from solvent tank 40 and conduit 84 from a source of insecticide 42 (see FIG. 4).

Connected to manifold 20 is a pressure line 44 which feeds to a pressure switch 45 (see FIGS. 2 and 4) inside of localized control portion 38. Mounted on an interconnect panel 46 of localized control portion 38 is a pump override switch 48 that may override the pressure switch 45 as will be subsequently explained in more detail. Electrical connector 50 mounted on interconnect panel 46 provides an electrical connection between the localized control portion 38 of the insecticide spraying apparatus 10 and the remote control device, represented generally by reference numeral 52 and shown in a pictorial perspective in FIG. 3.

A connector 54 of the remote control device 52 provides a connection with electrical connector 50 of the localized control portion 38. The remote control device 52 has a cable 56 connecting between connector 54 and the internal components of the remote control device 52. The remote control device 52 has an upper housing 58 that slides into position over lower housing 60. A mounting bracket 62 pivotally connects the upper and lower housings 58 and 60 of the remote control device 52 thereto through a pivotal connection with pivot knobs 64. The face plate 66 of the remote control device 52 has a digital display 68 of the flow rate of insecticide flowing to nozzles 26 and 28 as will be subsequently described in more detail. To allow for remote starting of the motor 12, a start swich 70 and throttle/ignition switch 72 are also located on the face plate 66. A low pressure indicator 74 located on face plate 66 will light up if the pressure in discharge nozzles 26 and 28 is less than a predetermined amount as determined by pressure switch 45. A pump switch 76 and flow rate control knob 78 are also located on face plate 66.

Figure 2:
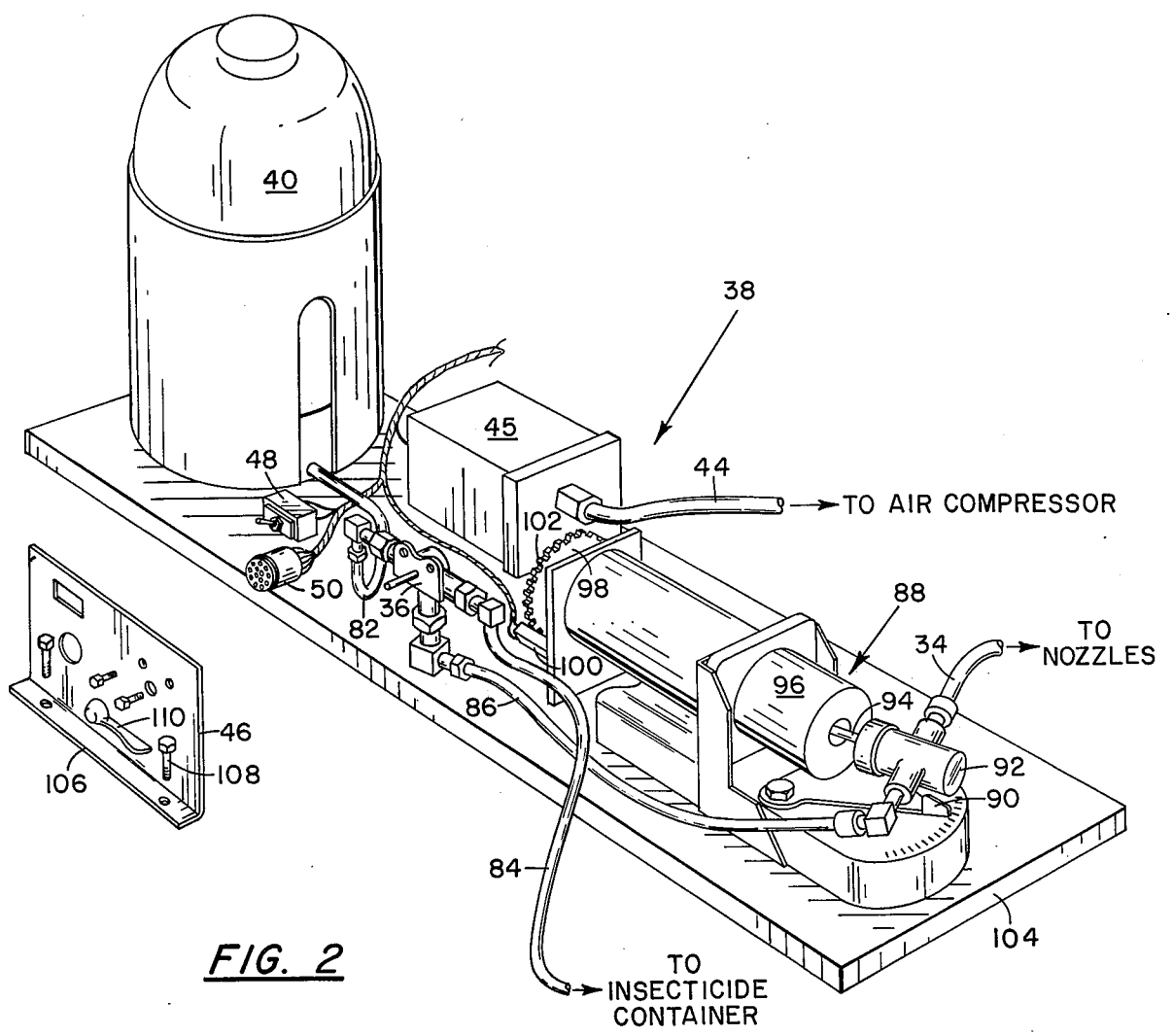
FIG. 2 is a partially exploded respective view of a localized control portion of the insecticide spraying apparatus.

Referring now to FIG. 2 of the drawings, there is shown the localized control portion 38 in a partially exploded perspective view with the protective cover 80 being removed. The solvent tank 40 connects through conduit 82 to one side of selector valve 36. The other side of selector valve 36 connects through conduit 84 to the insecticide 42. The third line, or output line 86, connects through metering pump 88 to insecticide conduit 34. The metering pump 88 may be initially set at the factory by adjusting lever 90 to a given position. By the adjustment of the lever 90, the stroke length of a positive displacement piston (not shown) inside of piston housing 92 is varied. A piston rod 94 drives the piston inside of piston housing 92 and extends inside of metering pump housing 96. A shaft (not shown) extends through the opposite end of metering pump housing 96, the rotational speed of the shaft being directly related to the number of strokes of the piston rod 94. Mounted on the shaft is a tach wheel 98 for rotation therewith. Adjacent to the tach wheel 98 is a magnetic pickup device 100 that gives a voltage output each time an individual spoke 102 passes by the magnetic pickup device 100. Once the stroke length of the piston rod 94 has been set by lever 90, there is a direct relationship between the number of individual voltage outputs from magnetic pickup device 100 and the rotational speed of the metering pump 88. Likewise, there is direct relationship between the rotational speed of the metering pump 88 and the rate of flow of insecticide through insecticide conduit 34.

The pressure switch 45, which is connected to the manifold 20 by pressure line 44, is located in the localized control portion 38. The electrical contacts (not shown) for the pressure switch 45 connect through electrical connector 50 to the remote control device 52. The interconnect panel maintaining the electrical connector 50 in a fixed position is attached to a base 104 by means of flange 106 and bolts 108. Also, the selector valve 36 is mounted on the interconnect panel 46 and operated by selector valve lever 110.

Figure 3:
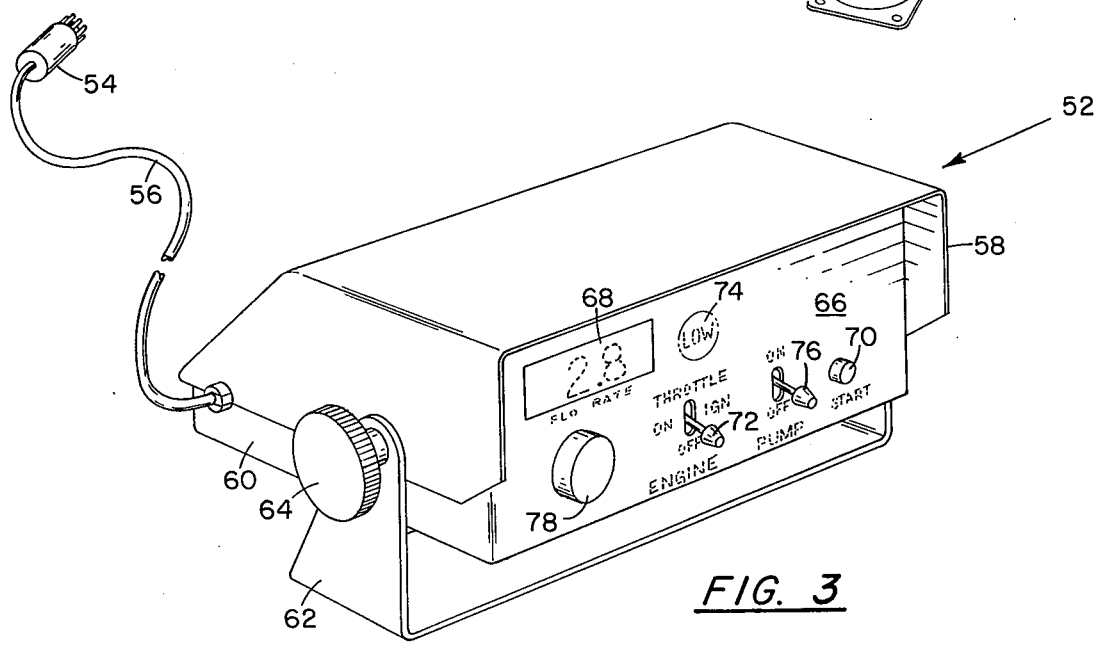
FIG. 3 is a perspective view of the remote control device.
Figure 4:
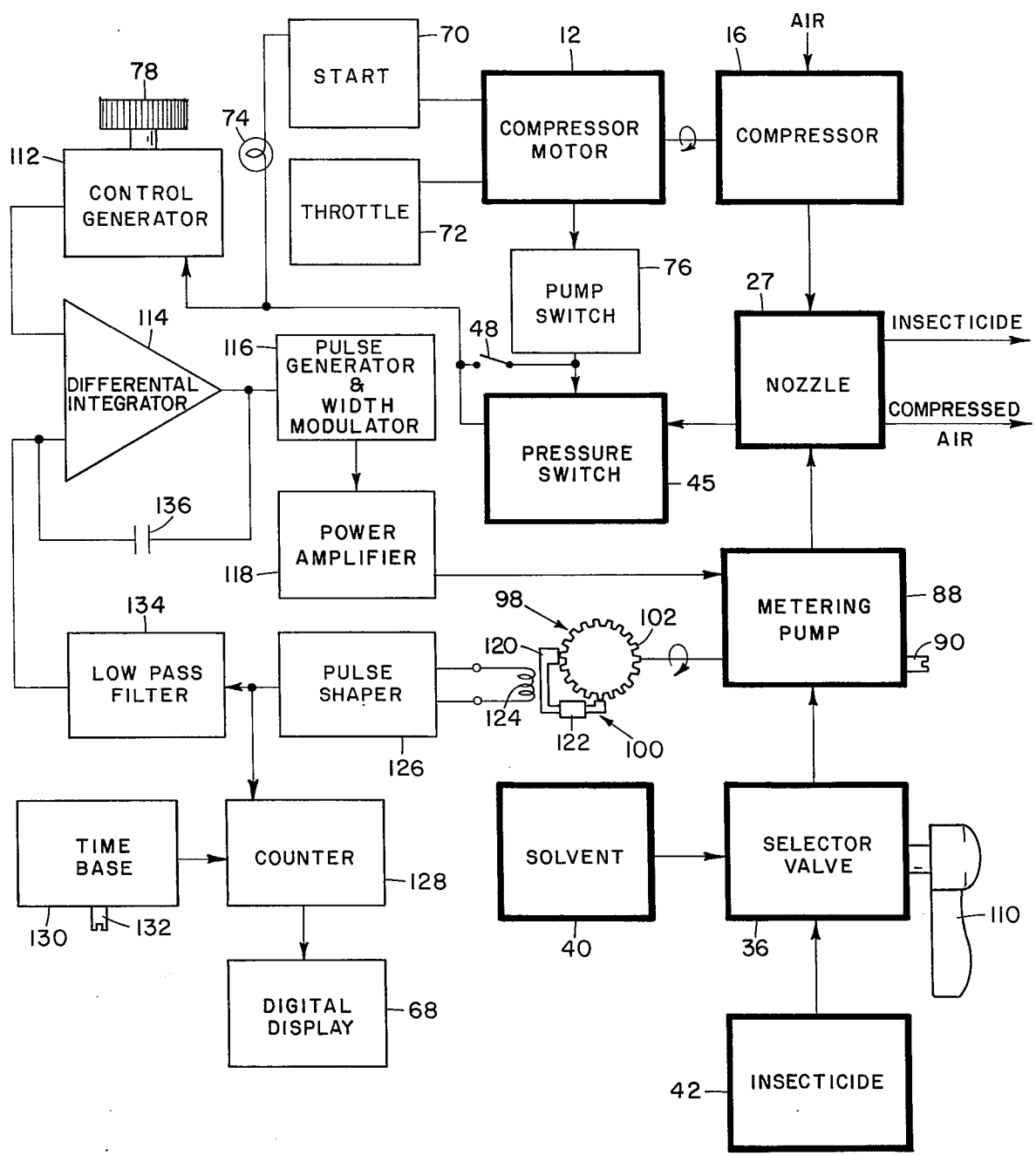
FIG. 4 is a block diagram of mechanical components of the spraying apparatus, and remote and localized electrical controls associated therewith.

Referring to FIG. 4 of the drawings in conjunction with the previously described FIGS. 1, 2 and 3, like numerals will be used to designate like components as previously described. The discharge nozzles 26 and 28 shown in FIG. 1 will be referred to as a single nozzle 27 for the purpose of clarity. Referring to FIG. 4, by positioning throttle/ignition switch 72 in its ignition position, an individual can push the start switch 70 to start compressor motor 12. The starting of the compressor motor 12 will turn the compressor 16. By increasing the throttle of throttle/ignition switch 72, the speed of the compressor motor 12 will be increased, as well as the speed of the compressor 16. The compressor 16 draws air therein and feeds the pressurized air to nozzle 27. The pressurized air inside of nozzle 27 upon reaching a predetermined pressure level will close an internal switch (not shown) in pressure switch 45. From the electrical system of compressor motor 12, an electrical connection is made through pump switch 76 and the internal switch of pressure switch 45 to a control generator 112. The setting for the control generator 112 is set by flow rate control knob 78 connected thereto. A bypass for the pressure switch 45 is provided by pump override switch 48. After starting compressor motor 12, but prior to the closing of pressure switch 45, low pressure light 74 will illuminate to indicate that the predetermined pressure level has not been reached and no insecticide is being pumped.

The output from the control generator 112 feeds into a differential integrator 114 along with a feedback input as will be subsequently described in more detail. If the feedback input and the output from the control generator 112 are equal, the differential integrator 114 will have a zero output that connects to pulse generator and width modulator 116. An output from the pulse generator and width modulator 116 with a zero input will be a nonsymmetrical pulsed square wave that is fed into power amplifier 118 which increases the amplitude of the pulsed square wave and then applies it to metering pump 88. The pulsed square wave being fed into the metering pump 88 will cause the metering pump 88 to turn at a predetermined speed to pump a given output as set by lever 90 and pictorially represented in FIG. 4 as an internal set screw.

As the metering pump 88 turns, either solvent 40 or insecticide 42 will be drawn through selector valve 36, depending upon the position of selector valve lever 110. Also, the turning of the metering pump 88 will cause the tach wheel 98 to turn. By location of the magnetic pickup device 100, which includes a permanent magnet 122 and an iron core 120 immediately adjacent the spokes 102 of the tach wheel 98, a pulsed signal is generated in coil 124. The pulsed signal generated in coil 124 is converted to a positive rectangular wave form by pulse shaper 126.

The output from the pulse shaper 126 is fed into counter 128 along with clock signals from a time base 130. By proper adjustment of the internal set screw 132 of the time base 130, a predetermined frequency of pulses will be received by counter 128. The number of pulses received from the pulse shaper 126 is directly related to the flow rate through the metering pump 88. By proper adjustment of the time base 130, the counter 128 will give an output to digital display 68 that will be the flow rate through metering pump 88.

Also, the output from the pulse shaper 126 is filtered through a low pass filter 134 to give essentially a DC voltage input to differential integrator 114. By the feedback capacitor 136 connected between the feedback input of the differential integrator 114 and the output thereof, a difference in the inputs of the differential integrator 114 will cause an output to the pulse generator and width modulator 116. A change from the zero output of the differential integrator 114 will vary the pulse width of the output signal from pulse generator and width modulator 116. The varying of the pulse width as amplified through power amplifier 118 will vary the speed of the metering pump 88.

Figure 5:
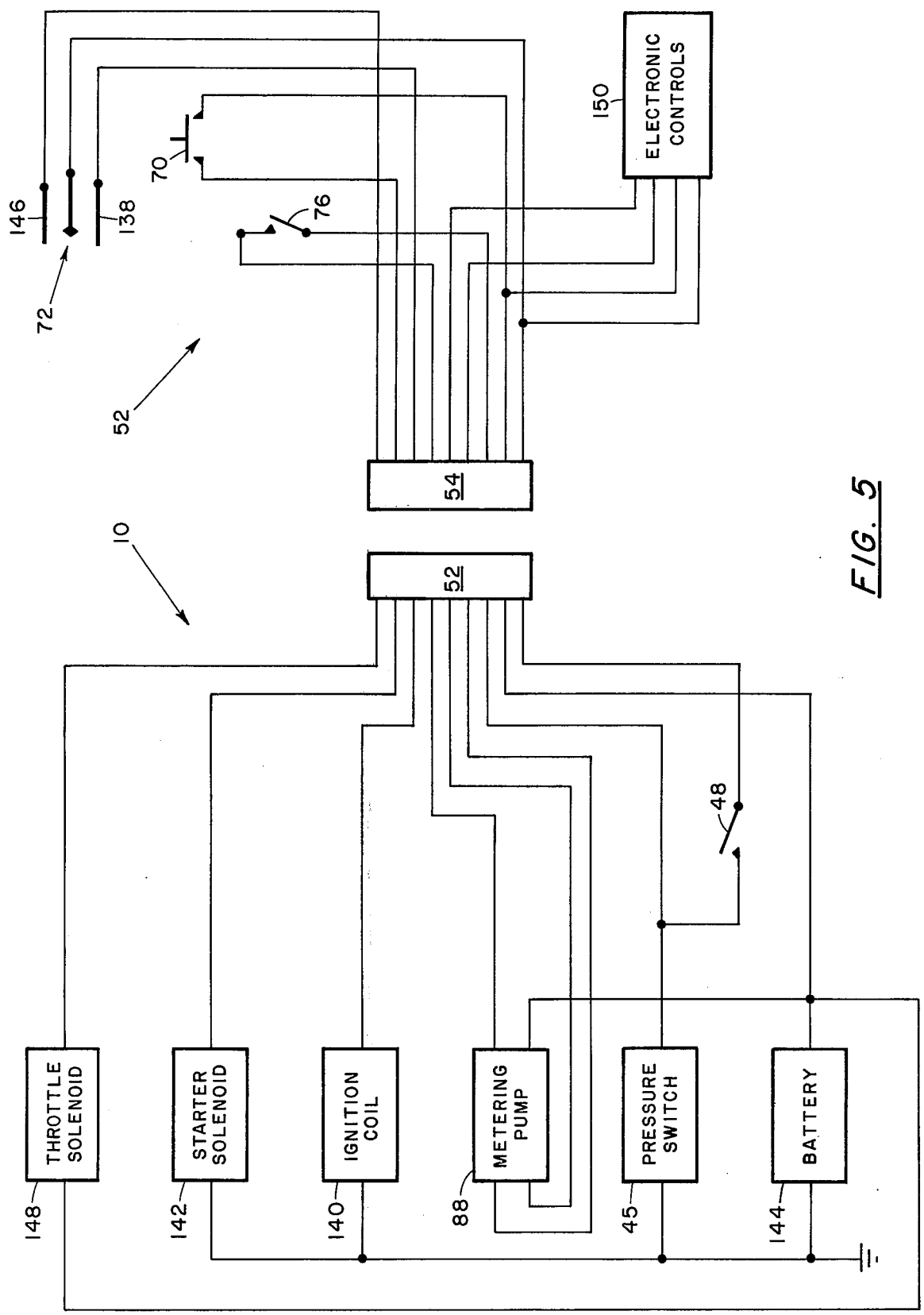
FIG. 5 is a schematic wiring diagram between the remote control device shown in FIG. 3 and the insecticide spraying apparatus shown in FIG. 1.

Referring to FIG. 5 of the drawings in conjunction with previously described FIGS. 1, 2, 3 and 4, the electrical connections between remote control device 52 and the insecticide spraying apparatus 10 is shown in more detail. At least nine pins are included in electrical connector 52 and male connector 54, as well as nine wires in electrical cable 56.

By positioning the throttle/ignition switch 72 in the ignition position against ignition contact 138 and pushing the start switch 70, the ignition coil 140 and the starter solenoid 142 will be energized from battery 144. After the motor 12 has been started, the position of the throttle/ignition switch 72 is changed to make contact with throttle contact 146. Thereby throttle solenoid 148 is energized increasing the speed of the compressor motor 12 and the compressor 16. Once the pressure swich 45 is closed, and upon closing the pump switch 76, the metering pump 88 will begin turning to pump the insecticide. During calibration, it may be necessary to turn the metering pump ON, even though pressure switch 45 is not closed; therefore, the pump override switch 48 is included to bypass the pressure switch 45.

Electrical components previously described in FIG. 4 and contained in remote control device 52, but not previously described hereinabove in the description of FIG. 5, are contained in the electronic controls 150. The electronic controls 150 may include printed circuit boards with appropriate electrical components located thereon.

METHOD OF OPERATION

The insecticide spraying apparatus 10 and associated remote control device 52 should be calibrated at the factory. Particularly, the metering pump 88 and time base 30 must be calibrated. Depending upon the insecticide an individual or organization intends to pump through metering pump 88, the lever 90 located thereon is set for a given stroke length of the piston rod 94. By disconnecting the insecticide conduit 34 from the nozzle 27 and using a measuring device, the flow rate of the metering pump 88 for a given signal from the control generator 112 can be accurately determined. By adjusting the set screw 132 from the time base 130, the individual feedback signals accumulated in counter 128 from the magnetic pickup device 100 can be varied. Since there is a linear relationship between the number of pulses generated by the magnetic pickup device 100 and the flow rate through metering pump 88, the correct flow rate can be accurately given in accumulated individual feedback signals and displayed in digital display 88. Thereafter, by varying the control voltage from control generator 112 by turning flow rate control knob 78, the speed of the metering pump 88 will be varied. As the speed of the metering pump 88 is varied, the number of individual feedback signals received in the counter 128 from the magnetic pickup device 100 between individual clock pulses will also be varied. Since the variation is linear, the digital display 68 will again accurately reflect the new flow rate through metering pump 88.

If it becomes necessary to make a large change in the amount of fluid being pumped through metering pump 88, as may be necessary when changing insecticide, lever 90 can be repositioned to change the stroke length of piston rod 94, and the time base 130 recalibrated. The entire calibration process can take place without starting the compressor motor by using pump override switch 48 to bypass the pressure switch 45.

In actual use, all the operator needs to do is to connect the insecticide 42 to the selector valve 36 and position the selector valve lever 110 in the appropriate position. Thereafter, the compressor motor 12 is started by turning the throttle/ignition switch 72 to the ignition position and pushing the start switch 70. After starting the compressor motor 12 and increasing the speed by repositioning throttle/ignition switch 72 to the throttle position to turn off the low pressure indicator, the operator can set into the digital display 68 a desired flow rate by adjusting flow rate control knob 78. The same flow rate will be maintained despite changing environmental conditions, such as temperature or pressure of the compressed air, provided at least the predetermined pressure level is maintained. If the pressure inside of the nozzle 27 ever drops below the predetermined pressure level, the metering pump 88 will be turned OFF by pressure switch 45 and low pressure indicator 74 will light up.

Upon completion of the spraying operation, by the positioning of selector valve lever 110 in the appropriate position, solvent 40 is fed through the selector valve 36 and metering pump 88 to nozzle 27 for discharge to atmosphere. The solvent will dissolve the insecticide and clean the spraying apparatus 10, never requiring an operator to come in contact with the insecticide.

We claim:

1. Spraying apparatus for spraying accurately controlled amounts of liquid into the atmosphere without direct measurement of the liquid flow, said apparatus comprising a source of said liquid, a nozzle through which said liquid is sprayed, conduit means extending between said source and said nozzle and liquid pumping means interposed along said conduit means, said liquid pumping means comprising a metering pump of the positive displacement type, the liquid flow through which corresponds directly to its operational speed, a pump shaft connected to said pump, remote sensing means connected to said pump shaft to detect the pump shaft speed, said remote sensing means comprising an electrical signal generator arranged to produce electrical flow rate signals in direct relationship to the rotational speed of said pump shaft and further comprising a remote display for remotely displaying said electrical flow rate signals, a control generator arranged to be adjusted at said remote display and settable to produce control signals and electrical circuit means comprising a differential detection circuit connected to receive said control signals and said flow rate signals and to produce an adjustment signal corresponding to the difference between said control and flow rate signals and means for changing pump speed in accordance with said adjustment signal.

2. The apparatus of claim 1 wherein a source of auxiliary fluid is connected to said conduit means between said pump and said nozzle.

3. The apparatus of claim 2 wherein said source of auxiliary fluid is a compressed air source.

4. The apparatus of claim 3 wherein said nozzle is of the atomizing type and is connected to receive atomizing air from said compressed air source.

5. The apparatus of claim 1 wherein said means for changing pump speed comprises a pulse generator connected and arranged for generating electrical pulses and for applying said pulses to said pump for driving same and a pulse width modulator coupled between said pulse generator and said pump to adjust the width of said pulses, said pulse width modulator being connected to receive said adjustment signal.

6. The apparatus of claim 1 wherein said control signal generator is arranged to be adjusted from a remote control panel and wherein said remote sensing and control means includes a display at said remote control panel to display said flow rate signal.

7. A method of remotely operating a spraying apparatus to spray accurately controlled amounts of a liquid chemical into the atmosphere without direct measurement of liquid flow, said method comprising the steps of pumping said liquid chemical through an electrically driven pump to a nozzle and discharging said liquid through said nozzle into the atmosphere, said pumping being carried out by positive displacement and metering of said liquid whereby the liquid flow rate to said nozzle corresponds to the operational speed of said pump, detecting the operational speed of the pump by sensing the shaft speed of the pump, displaying the detected shaft speed at a remote location, generating a control signal at said remote location applying said control signal to a comparator, generating a feedback signal corresponding to said detected operational speed of said pump and applying said feedback signal to said comparator, comparing said control signal and said feedback signal in said comparator and producing a difference signal corresponding to the difference between said control and feedback signals and adjusting the operating speed of said pump according to said difference signal.

8. A method according to claim 7 wherein another fluid is combined with said liquid chemical as it passes from said pump and said nozzle and wherein said liquid chemical and fluid are ejected together from said nozzle.

9. A method according to claim 7 wherein said control signal is adjusted from said remote location.

10. A method according to claim 7 wherein said operational speed of said pump is detected by producing a series of electrical pulses with each pulse occurring when a rotating shaft on said pump has turned by a given amount and by detecting the number of said pulses which occur within a predetermined time duration.

11. A method according to claim 10 wherein the displacement of said pump is adjustable and wherein said predetermined time duration is adjusted in accordance with said displacement to maintain calibration of said pump.

12. A method according to claim 7 wherein said pump is electrically driven and is supplied with electrical power in the form of a series of pulses and wherein said operating speed is adjusted by controlling the width of said pulses.

13. A method according to claim 10 wherein said pump is electrically driven and is supplied with electrical power in the form of a series of pulses and wherein said operating speed is adjusted by controlling the width of said pulses.

14. A method according to claim 11 wherein said pump is electrically driven and is supplied with electrical power in the form of a series of pulses and wherein said operating speed is adjusted by controlling the width of said pulses.

* * * * *